(12) United States Patent
Kaye

(10) Patent No.: US 6,508,713 B1
(45) Date of Patent: Jan. 21, 2003

(54) TORSIONAL VIBRATION DAMPER

(76) Inventor: Kenneth B. Kaye, 10277 S. Appaloosa Ave., Floral City, FL (US) 34436

( * ) Notice: Subject to any disclaimer, the term of this patent is extended or adjusted under 35 U.S.C. 154(b) by 0 days.

(21) Appl. No.: 09/805,312

(22) Filed: Mar. 13, 2001

(51) Int. Cl.$^7$ .................................................. F16D 3/70
(52) U.S. Cl. ................................................ 464/71; 464/83
(58) Field of Search ............................ 464/70, 71, 72, 464/83, 81, 85; 440/83

(56) References Cited

U.S. PATENT DOCUMENTS

| | | | | |
|---|---|---|---|---|
| 1,793,347 A | * | 2/1931 | Weir et al. ..................... | 464/71 |
| 1,820,750 A | * | 8/1931 | Lord ............................ | 464/71 |
| 2,742,770 A | * | 4/1956 | Graham ........................ | 464/71 |
| 3,226,579 A | * | 12/1965 | Bygdnes .................... | 464/71 X |
| 3,477,245 A | * | 11/1969 | Martin ......................... | 464/72 |
| 3,988,907 A | | 11/1976 | Bohm et al. | |
| 4,351,167 A | | 9/1982 | Hanke et al. ................. | 464/24 |
| 4,561,532 A | | 12/1985 | Knödel .................... | 192/106.1 |
| 4,634,391 A | | 1/1987 | Entringer et al. ............. | 440/75 |
| 4,813,909 A | | 3/1989 | Eckel et al. .................. | 464/90 |
| 4,848,551 A | | 7/1989 | Caspar .................... | 192/106.2 |
| 5,522,747 A | * | 6/1996 | Kirschey ..................... | 440/83 |
| 5,545,089 A | * | 8/1996 | Krischey ..................... | 464/83 |
| 5,562,544 A | | 10/1996 | Ochs et al. ................... | 464/89 |
| 5,630,758 A | * | 5/1997 | Rivin ...................... | 464/83 X |
| 5,711,407 A | | 1/1998 | Maier ......................... | 192/201 |
| 6,053,295 A | | 4/2000 | Orlamünder et al. ...... | 192/55.3 |
| 6,077,135 A | | 6/2000 | Ito ............................... | 440/83 |
| 6,089,121 A | | 7/2000 | Lohaus ........................ | 74/574 |
| 6,113,497 A | | 9/2000 | Qualls ......................... | 464/88 |
| 6,117,016 A | | 9/2000 | Nett et al. .................... | 464/87 |
| 6,131,487 A | | 10/2000 | Jäckel et al. .................. | 74/574 |
| 6,135,890 A | | 10/2000 | Kraft ........................... | 464/68 |
| 6,179,714 B1 | | 1/2001 | Friedmann et al. .......... | 464/24 |

FOREIGN PATENT DOCUMENTS

| | | | | |
|---|---|---|---|---|
| DE | 905 562 | * | 3/1954 | ................. 464/85 |
| GB | 459325 | * | 1/1937 | ................. 464/83 |
| JP | 5-202946 | * | 8/1993 | ................. 464/71 |

* cited by examiner

*Primary Examiner*—Greg Binda
(74) *Attorney, Agent, or Firm*—Holland & Knight LLP

(57) ABSTRACT

A coupling assembly adapted to connect an engine directly to a transmission, comprising in combination a flywheel adapted to be connected to the engine. A modified transmission plate for connecting the transmission to the flywheel is provided. The modified transmission plate has a plurality of connection ports that contain alternatively at least a first torsional dampener and at least a second torsional dampener that are positioned within the connection port. The first torsional dampener has a first indentation hardness that is less than the second indentation hardness of the second torsional dampener. The first torsional dampener is adapted to dampen engine idle vibrations and the second torsional dampener is adapted to dampen engine acceleration vibrations. Whereby, the first torsional dampener and the second torsional dampener reduce the emission of torsional vibrations between the engine and the transmission.

3 Claims, 4 Drawing Sheets

TORSIONAL VIBRATION DAMPER

BACKGROUND OF THE INVENTION

1. Field of the Invention

The invention relates to a transmission coupling assembly for absorbing axial and/or angular displacement between an internal combustion engine and a transmission. The invention is particularly suited to propulsion systems where the internal combustion engine that is connected directly to the transmission.

2. Description of the Background Art

One of the most common uses for a propulsion system that has the engine directly connected to the transmission is in small watercraft. Most small watercraft use two or three cylinder engines. Such engines, however, can be prone to internal vibrational problems.

For instance, the explosive forces acting on the pistons and the inertia forces of the moving parts vary in intensity as the pistons of the engine reciprocate. The resulting variation of force or torque on the crankshaft causes the crankshaft to twist in an oscillatory fashion so as to transmit torsional vibration. Torsional vibration is more noticeable at certain speeds and can be irritating to the rider. Such vibrations may also damage the crankshaft. That is, as the shaft winds up and relaxes under the oscillatory torsional force, alternating stresses internal to the shaft occur. Such stresses can cause failure under some conditions.

Prior propulsion systems have not adequately isolated the watercraft hull from such vibration, nor have they included a suitable mechanism to shift the severity of the resulting resonance. Vibration-absorbing engine mounts have been used in an attempt to lessen vibration transmission from the engine to the watercraft hull. Although somewhat effective in reducing the engine vibration felt by the rider, such mounts do not dampen torsional vibrations within the crankshaft.

Heretofore known vibration damping apparatus of the above outlined type employ dampers which have energy storing elements acting in the circumferential direction of the flywheels and normally including coil springs which store elastic energy, and additional energy storing elements which act in the axial direction of the flywheels and cooperate with friction pads and/or linings to produce friction (i.e., hysteresis). The means for generating friction operate in parallel with energy storing means which act in the circumferential direction of the flywheels.

It has been found that certain conventional vibration damping apparatus can operate satisfactorily (i.e., they are capable of damping torsional vibrations as well as noise) but only under specific circumstances. Thus, the mode of operation of such conventional apparatus is not entirely satisfactory under many operating conditions because their design is a compromise due to an attempt to ensure satisfactory or acceptable operation under a variety of different conditions. For example, a purely mechanical solution does not suffice to cover a wide spectrum of operating conditions entailing the development of many basically different stray movements and noise levels.

Moreover, purely mechanical solutions are quite expensive, especially if they are to adequately suppress stray movements and noise under a variety of different operating conditions. This is due to the fact that, if a mechanically operated vibration damping apparatus is to counteract a wide range of amplitudes of undesirable stray movements of the flywheels relative to each other, such undertaking greatly increases the cost, bulk, complexity and sensitivity of the apparatus.

Moreover, even a very complex and expensive mechanical vibration damping apparatus is incapable of operating satisfactorily under any one of a wide range of different operating conditions because the individual damper stages (i.e., hysteresis produced by individual energy storing elements which act in the circumferential direction of the flywheels) cannot be altered as a function of changes in operating conditions. Still further, presently known apparatus are subject to extensive wear so that their useful life is relatively short, and they are also prone to malfunction.

Inventors have created several types of coupling devices designed to absorb the torsional forces with an elastic component built within the coupling device. For example, U.S. Pat. No. 3,988,907 (1976) discloses a rubber & fabric combination which claims to transmit torque while controlling unwanted forces. However this device is limited to the strength of the fabric and the limitations of the maximum diameter which would be required to manage high torque engines. Additionally this device requires the use of additional components to adapt to the desired object and therefore results in a greater number of components for potential failure while adding additional weight.

U.S. Pat. No. 4,813,909 (1989) claims to elastically couple two rotating devices, but is very complex in design and results in a excessively expensive manufacturing process and is only effective for the specific rotating device for which it is designed.

U.S. Pat. No. 4,351,167 (1982) uses the technology of the old metal spring type couplers and substitutes rubber and fluid for the metal springs. This design is to complex and has limited applications based on the design and limited force handling capability.

U.S. Pat. No. 4,634,391 (1987) manages the torsional forces from the engine, but has limited application specific to a stern drive shaft. Additionally the encapsulated elastomeric element will fail to convert the drive torque to the stern drive with the application of a high torque output engine and will be permanently damaged as a result of this failure.

Additional devices in the industry reveal no designs capable of handling high torque applications without the use of multiple massive adapters at a very high manufacturing cost even in the most standard of applications. Additionally, these devices using multiple adapters result in undesired excessive reciprocating mass.

As has been mentioned before, the above-described known measures are only to a very limited degree capable of damping the torsional vibrations caused by irregularities in the rotational speed of the engine. The known damping elements are effective only within a limited vibration range. Especially in the case of low frequencies, their effectiveness decreases rapidly so that the disagreeable noise makes itself particularly felt when the motor is idling.

Therefore, there exists a need in the art to reduce the emission of torsional vibrations between the engine and the transmission in a propulsion system.

Nothing in the prior art provides the benefits attendant with the present invention.

Therefore, it is an object of the present invention to provide an improvement which overcomes the inadequacies of the prior art devices and which is a significant contribution to the advancement of the art.

An object of the invention is to provide a vibration and noise damping apparatus whose versatility exceeds that of heretofore known apparatus and which can be used in a wide variety of propulsion systems.

Another object of the invention is to provide an apparatus whose dampening characteristics can conform to the different vibrations of propulsion systems under a wide variety of different operating conditions and/or other influences.

An additional object of the invention is to provide an apparatus which operates properly at low or high rotational speeds as well as at resonance revolutions per minute (RPM).

Still another object of the invention is to provide an apparatus which can properly prevent transmission of undesirable vibrations between an engine and a transmission under a variety of apparently contradictory or conflicting circumstances without affecting the quality, reliability and/or reproducibility of the vibration suppressing action.

Another object of the invention is to provide a relatively simple, compact and inexpensive apparatus which can be readily assembled or taken apart and whose useful life is eminently satisfactory for utilization between the engine and transmission of a propulsion vehicle.

A further object of the invention is to provide an apparatus wherein the wear upon the parts is not pronounced and whose utilization entails minimal losses in the driving system.

Another object of the invention is to provide torsional dampeners that are made from plastic, rubber, fiberglass, and mixtures thereof.

A further object of the invention is to provide a first torsional dampener having a first indentation hardness and a second torsional dampener having a second indentation hardness.

An additional object of the invention is to provide a first torsional dampener being adapted to dampen engine idle vibrations and a second torsional dampener being adapted to dampen engine acceleration vibrations.

Still another object of the invention is to provide a coupling assembly adapted to connect an engine directly to a transmission, comprising in combination a flywheel adapted to be connected to the engine; a transmission plate adapted to be connected to the transmission, said transmission plate having a plurality of connection ports, said plurality of connection ports connecting said flywheel to said transmission plate; a first torsional dampener being positioned in at least one of said plurality of connection ports; and a second torsional dampener being positioned in at least one of said plurality of connection ports, whereby the emission of torsional vibrations between said engine and said transmission are reduced through said first torsional dampener and said second torsional dampener.

Yet another object of the invention is to provide a coupling assembly adapted to connect an engine directly to a transmission, comprising in combination a flywheel adapted to be connected to the engine; a transmission plate adapted to be connected to the transmission, said transmission plate having a first connection port and a second connection port, said first connection port and said second connection port connecting said flywheel to said transmission plate; a first torsional dampener being positioned within said first connection port; and a second torsional dampener being positioned within said second connection port, whereby the emission of torsional vibrations between said engine and said transmission are reduced through said first torsional dampener and said second torsional dampener.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an apparatus for reducing the emission of torsional vibrations between an engine and a transmission through the use of a first torsional dampener and a second torsional dampener.

A feature of the present invention is to provide a vibration and noise damping apparatus whose versatility exceeds that of heretofore known apparatus and which can be used in a wide variety of propulsion systems.

Yet another feature of the present invention is to provide an apparatus whose dampening characteristics can conform to the different vibrations of propulsion systems under a wide variety of different operating conditions and/or other influences.

Another feature of the present invention is to provide an apparatus which operates properly at low or high rotational speeds as well as at resonance revolutions per minute (RPM).

Still another feature of the present invention is to provide an apparatus which can properly prevent transmission of undesirable vibrations between an engine and a transmission under a variety of apparently contradictory or conflicting circumstances without affecting the quality, reliability and/or reproducibility of the vibration suppressing action.

Still yet another feature of the present invention is to provide a relatively simple, compact and inexpensive apparatus which can be readily assembled or taken apart and whose useful life is eminently satisfactory for utilization between the engine and transmission of a propulsion vehicle.

Another feature of the present invention is to provide an apparatus wherein the wear upon the parts is not pronounced and whose utilization entails minimal losses in the driving system.

Still another feature of the present invention is to provide torsional dampeners that are made from plastic, rubber, fiberglass, and mixtures thereof.

Another feature of the present invention is to provide a first torsional dampener having a first indentation hardness and a second torsional dampener having a second indentation hardness.

Yet another feature of the present invention is to provide a first torsional dampener being adapted to dampen engine idle vibrations and a second torsional dampener being adapted to dampen engine acceleration vibrations.

Still yet another feature of the present invention is to provide a coupling assembly adapted to connect an engine directly to a transmission, comprising in combination a flywheel adapted to be connected to the engine. A transmission plate that is adapted to be connected to the transmission is provided. The transmission plate has a plurality of connection ports for connecting the transmission plate to the flywheel. At least one of the plurality of connection ports has a first torsional dampener positioned within the connection port and at least one of the plurality of connection ports has a second torsional dampener positioned within the connection port. Whereby, the first torsional dampener and the second torsional dampener reduce the emission of torsional vibrations between the engine and the transmission.

Another feature of the present invention is to provide a coupling assembly adapted to connect an engine directly to a transmission, comprising in combination a flywheel adapted to be connected to the engine. A transmission plate that is adapted to be connected to the transmission is provided. The transmission plate has a first connection port and a second connection port for connecting the transmission plate to the flywheel. The first connection port has a first torsional dampener positioned within the first connection port and the second connection port has a second torsional dampener positioned within the second connection port. Whereby, the first torsional dampener and the second torsional dampener reduce the emission of torsional vibrations between the engine and the transmission.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The invention will become more readily apparent from the following description of preferred embodiments thereof shown, by way of example only, in the accompanying drawings wherein.

Similar reference characters refer to similar parts throughout the several views of the drawings.

DETAILED DESCRIPTION OF THE INVENTION

Figure 1:
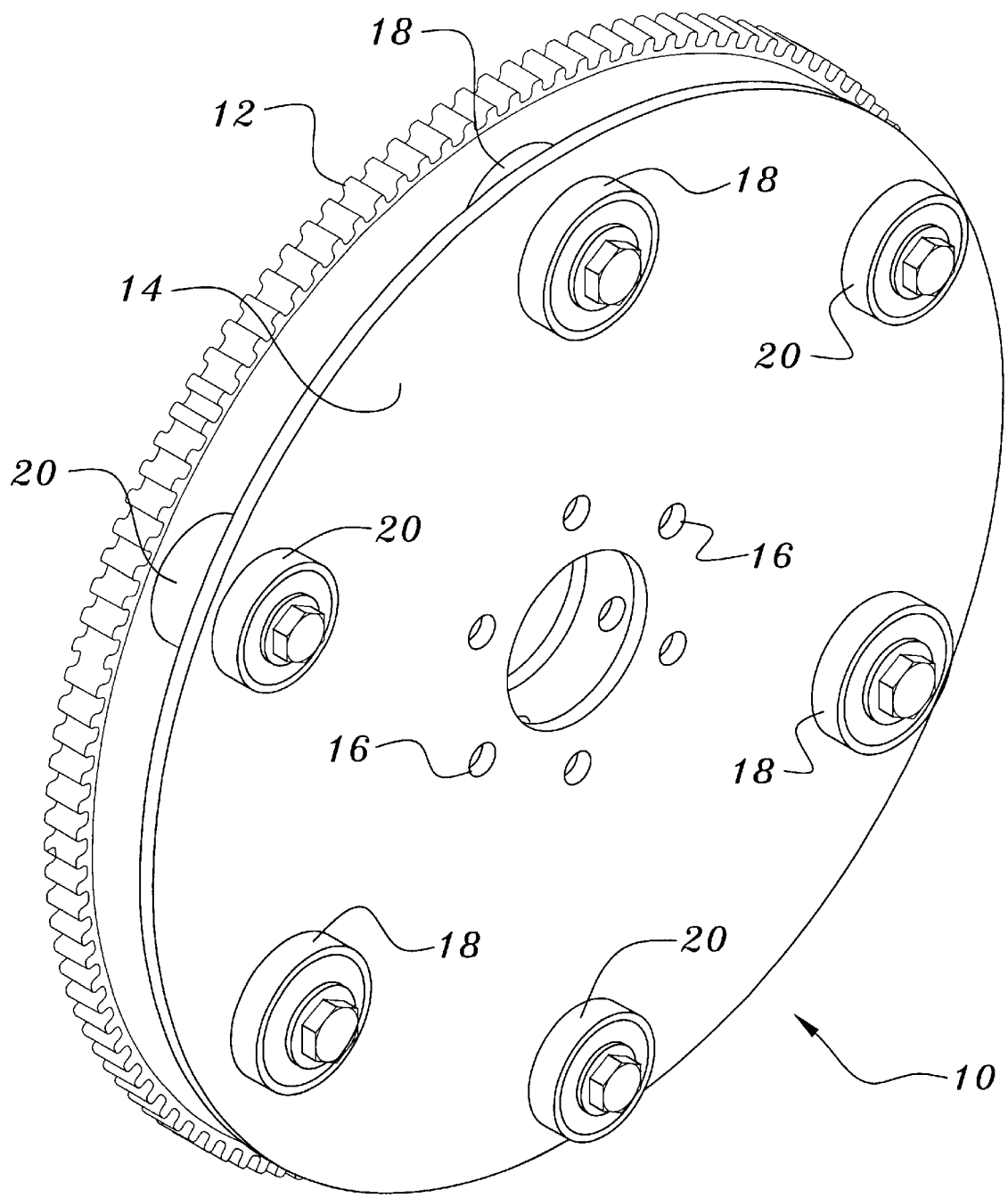
FIG. 1 is a perspective view of a preferred embodiment of the transmission coupling assembly of the present invention.

Reference will now be made to the drawings. FIG. 1 is a perspective illustration providing an overview of the entire apparatus 10.

More specifically, FIG. 1 shows a preferred embodiment of a coupling assembly 10. In this embodiment, the coupling assembly 10 is adapted to connect an engine (not shown) directly to a transmission (not shown). The coupling assembly 10 connects to the engine through a flywheel 12 that is adapted to be connected to the engine. Also, the coupling assembly 10 connects to the transmission through a transmission plate 14 that is adapted to be connected to the transmission.

Figure 2:
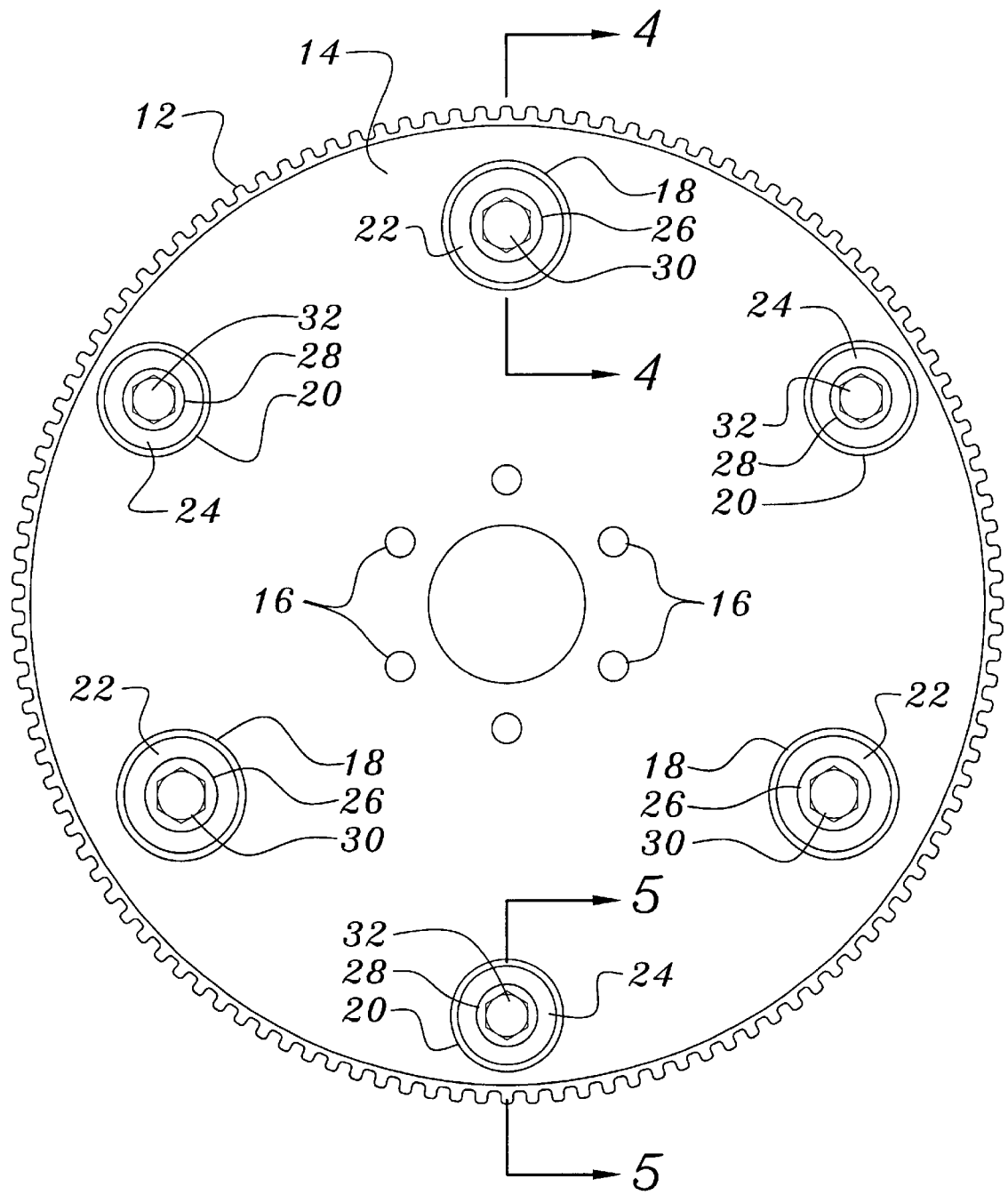
FIG. 2 is a front perspective view of the transmission coupling assembly of the present invention.

As best shown in FIG. 2, the transmission plate 14 has a plurality of transmission connection ports 16 for connecting the transmission plate 14 to the transmission. In addition, the transmission plate 14 has a plurality of connection ports 18, 20 for connecting the transmission plate 14 to the flywheel 12. At least one of the plurality of connection ports 18 has a first torsional dampener 22 positioned within the connection port 18. A second torsional dampener 24 is positioned in at least one of the other plurality of connection ports 20. Whereby, the first torsional dampener 22 and the second torsional dampener 24 combine to reduce the emission of torsional vibrations between the engine and the transmission during operation of a propulsion vehicle.

In another preferred embodiment of the present invention, as also shown in FIG. 2, the coupling assembly 10 connects to the engine (not shown) through a flywheel 12 that is adapted to be connected to the engine. The coupling assembly 10 connects to the transmission (not shown) through a transmission plate 14 that is adapted to be connected to the transmission.

Further, the transmission plate 14 has a plurality of transmission connection ports 16 for connecting the transmission plate 14 to the transmission. The transmission plate 14 has a first connection port 18 and a second connection port 20 for connecting the transmission plate 14 to the flywheel 12.

Figures 3, 4:
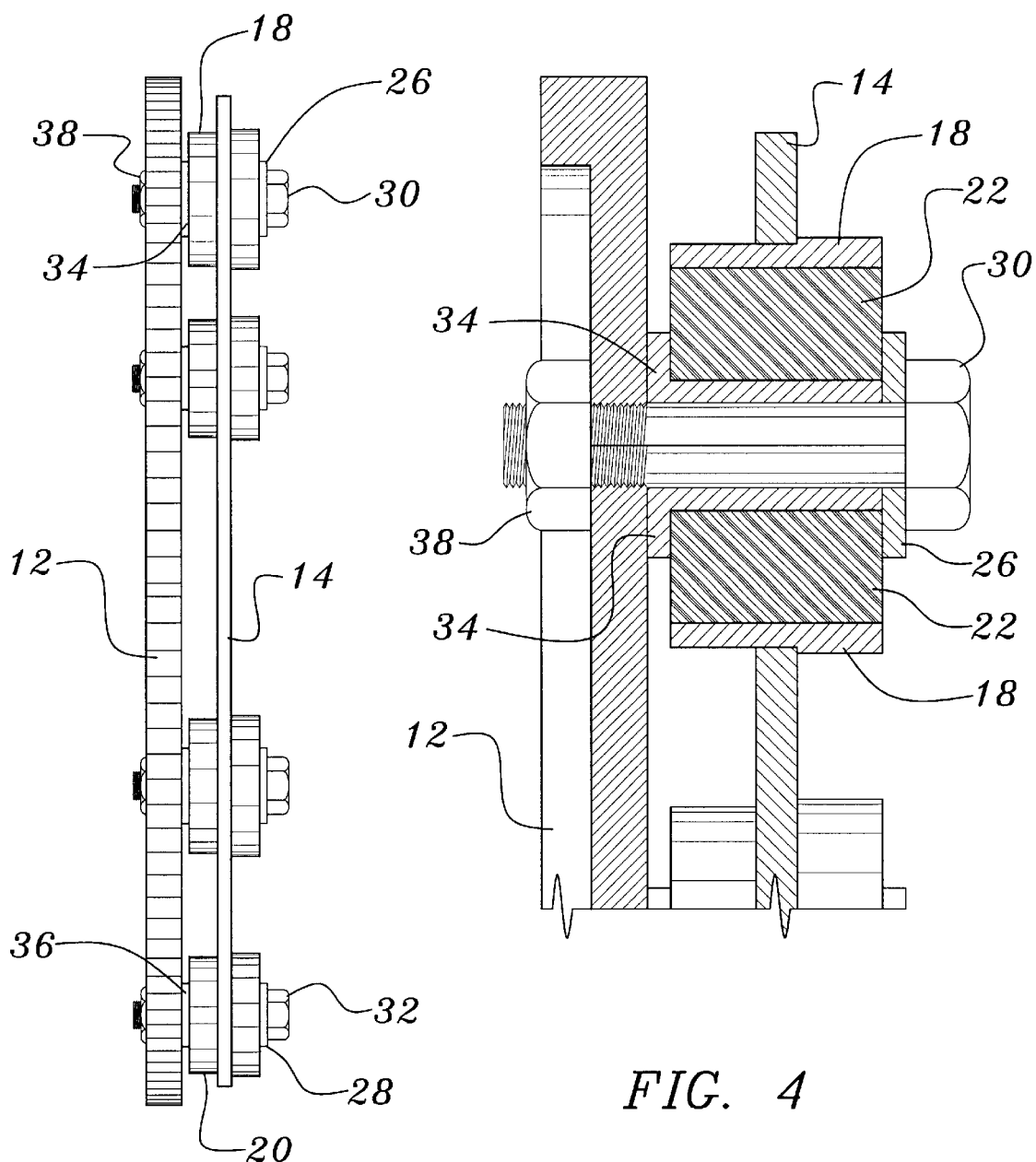
FIG. 3 is a side perspective view of the transmission coupling assembly of the present invention.
FIG. 4 is a cross sectional view of a first torsional dampener of FIG. 2 along line 4—4.

Referring to line 4—4 of FIG. 2, the first connection port 18 has a first torsional dampener 22 positioned within the first connection port 18. The first torsional dampener 22 has a first bushing 34 (as best shown in FIG. 4) inserted therethrough. A first connection bolt 30 is inserted through a first connection washer 26 and extends through the first bushing 34. Then, the first connection bolt 30 extends out the backside of the flywheel 12 and is held in place by a first connection nut 38 (as also shown in FIG. 4).

Figure 5:
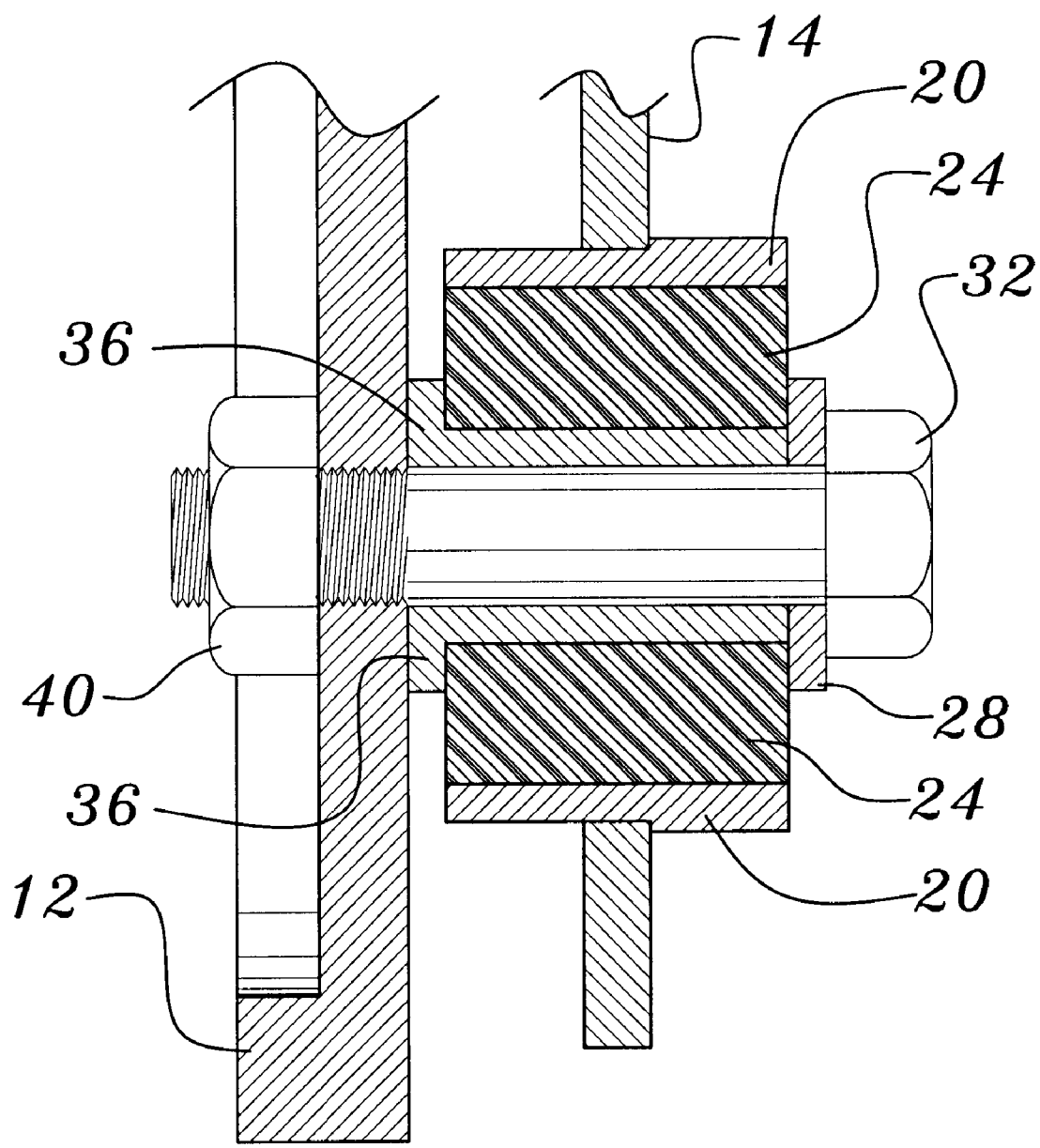
FIG. 5 is a cross sectional view of a second torsional dampener of FIG. 2 along line 5—5.

Referring to line 5—5 of FIG. 2, the second connection port 20 has a second torsional dampener 24 positioned within the second connection port 20. The second torsional dampener 24 has a second bushing 36 (as best shown in FIG. 5) inserted therethrough. A second connection bolt 32 is inserted through a second connection washer 28 and extends through the second bushing 36. Then, the second connection bolt 32 extends out the backside of the flywheel 12 and is held in place by a second connection nut 40 (as also shown in FIG. 5).

Whereby, the first torsional dampener 22 positioned within the first connection port 18 and the second torsional dampener 24 positioned within the second connection port 20 combine together to reduce the emission of torsional vibrations between the engine and the transmission of a propulsion vehicle.

The first torsional dampener and the second torsional dampener can be made out of plastic, rubber, fiberglass, and mixtures thereof. The material for the respective torsional dampener is chosen based on the size of the dampener and the torsional vibration that is to be dampened.

The first torsional dampener 22 has a first indentation hardness which is less than the second indentation hardness of the second torsional dampener 24. The first torsional dampener has a lower indentation hardness in order to absorb the torsional vibrations generated during engine idle. In addition, the first torsional dampener has an interference fit within the connection port which helps to absorb the vibrations generated during engine idle.

The second torsional dampener has a higher indentation hardness in order to dampen torsional vibrations generated during engine acceleration. In addition, the second torsional dampener has a clearance fit within the connection port which helps to absorb the vibrations generated during engine acceleration.

The first torsional dampener and the second torsional dampener can be of varying indentation hardness. The hardness of the first torsional dampener and the second torsional dampener is dictated by the centering distance of the respective connection port to the center of the transmission plate. Also, the hardness of the first torsional dampener and the second torsional dampener is dependent on the size and shape of the respective connection port.

As best shown in FIG. 2, in a preferred embodiment, both the first connection port and the second connection port are substantially round and the first connection port 18 is larger in diameter than the second connection port 20.

In a preferred embodiment, the first connection port is approximately 1.8620" in diameter and the second connection port is approximately 1.6440" in diameter. The first connection port's center is approximately 5.375" from the center of the transmission plate and the second connection port's center is approximately 5.750" from the center of the transmission plate. In addition, the first torsional dampener has a first indentation hardness in the range of 40 to 70 durometers and the second torsional dampener has a second indentation hardness in the range of 80 to 110 durometers.

As best shown in FIG. 3, the first connection port and the second connection port are spaced between the flywheel 12 and the transmission plate 14. In addition, FIG. 3 shows the first bushing 34 extending through and beneath the first connection port 18 and shows the second bushing 36 extending through and beneath the second connection port 20. The first bushing 34 and the second bushing 36 provide additional isolation of torsional vibrations between the flywheel 12 and the transmission plate 14.

FIG. 4 shows a cross sectional view along line 4—4 of FIG. 2 of the first connection port 18. This cross sectional view shows the first connection bolt 30 abutting the first connection washer 26. The first connection bolt 30 extends through the center of the first bushing 34 which is positioned in the center of the first torsional dampener 22. The first connection bolt 30 extends completely through to the backside of the flywheel 12 and is held in place by the first connection nut 38.

Lastly, FIG. 5 shows a cross sectional view along line 5—5 of FIG. 2 of the second connection port 20. This cross sectional view shows the second connection bolt 32 abutting the second connection washer 28. The second connection bolt 32 extends through the center of the second bushing 36 which is positioned in the center of the second torsional dampener 24. The second connection bolt 32 extends completely through to the backside of the flywheel 12 and is held in place by the second connection nut 40.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

I claim:

1. A coupling assembly adapted to connect an engine directly to a transmission, comprising in combination:
    a flywheel adapted to be connected to the engine;
    a transmission plate adapted to be connected to the transmission, said transmission plate having a first connection port and a second connection port, said first connection port and said second connection port are substantially round, said first connection port is larger than said second connection port, said first connection port and said second connection port connecting said flywheel to said transmission plate;
    a first bushing positioned within a first torsional dampener being positioned within said first connection port; and
    a second bushing positioned within a second torsional dampener being positioned within said second connection port, whereby the emission of torsional vibrations between said engine and said transmission are reduced through said first torsional dampener and said second torsional dampener.

2. A coupling assembly adapted to connect an engine directly to a transmission, comprising in combination:
    a flywheel adapted to be connected to the engine;
    a transmission plate adapted to be connected to the transmission, said transmission plate having a first connection port and a second connection port, said first connection port and said second connection port connecting said flywheel to said transmission plate;
    a first bushing positioned within a first torsional dampener being positioned within said first connection port, said first torsional dampener having a first indentation hardness; and
    a second bushing positioned within a second torsional dampener being positioned within said second connection port, said second torsional dampener having a second indentation hardness, said first indentation hardness of said first torsional dampener is less than said second indentation hardness of said second torsional dampener, whereby the emission of torsional vibrations between said engine and said transmission are reduced through said first torsional dampener and said second torsional dampener.

3. The coupling assembly defined in claim 2 wherein said first indentation hardness of said first torsional dampener is in the range of 40 to 70 durometers and said second indentation hardness of said second torsional dampener is in the range of 80 to 110 durometers.

* * * * *